United States Patent
Liu

(10) Patent No.: US 6,238,602 B1
(45) Date of Patent: May 29, 2001

(54) TWO-STAGE FORMING PROCESS FOR PRODUCING AN EXPANDED SOLE

(76) Inventor: Kun-Chung Liu, No. 5, Alley 9, Lane 212, San-Feng Rd., Hou-Li Hsiang, Taichung Hsien (TW)

( * ) Notice: Subject to any disclaimer, the term of this patent is extended or adjusted under 35 U.S.C. 154(b) by 0 days.

(21) Appl. No.: 09/460,719

(22) Filed: Dec. 14, 1999

(51) Int. Cl.$^7$ ................................................. B29C 44/02
(52) U.S. Cl. ........................ 264/40.1; 264/46.4; 264/51
(58) Field of Search ........................... 264/51, 40.1, 46.4

(56) References Cited

U.S. PATENT DOCUMENTS

| | | |
|---|---|---|
| 4,396,568 | 8/1983 | Voll et al. ........................... 264/134 |
| 4,418,483 | 12/1983 | Fujita et al. . |
| 5,141,578 | 8/1992 | Yang . |
| 5,147,589 * | 9/1992 | Chang et al. ........................ 264/46.4 |
| 5,177,824 * | 1/1993 | Ou ........................................ 264/55 |
| 5,308,420 | 5/1994 | Yang . |
| 5,318,645 | 6/1994 | Yang . |
| 5,560,877 | 10/1996 | Yung et al. . |
| 5,814,254 | 9/1998 | Bisconti . |
| 5,843,352 * | 12/1998 | Chi ........................................ 264/51 |
| 5,868,981 * | 2/1999 | Bisconti .............................. 264/51 |
| 5,972,257 | 10/1999 | Liu . |
| 6,129,798 * | 10/2000 | Yang .................................. 264/45.1 |
| 6,132,663 * | 10/2000 | Johnson et al. ..................... 264/250 |

* cited by examiner

Primary Examiner—Allan R. Kuhns
(74) Attorney, Agent, or Firm—Baker Botts L.L.P.

(57) ABSTRACT

A method for making an expanded sole, in which a blank is preliminarily molded as an unexpanded form in a preliminary mold and is then subjected to a product inspection, followed by a high temperature heating to undergo a reaction for expansion and cross-linking in a high-temperature mold, is disclosed. In the method, the unexpanded blank is formed with a thickness greater than and with a cross-section smaller than those of the mold cavity of the high-temperature mold via the preliminary mold, thus facilitating placement of the blank into the high-temperature mold and venting air easily from the high-temperature mold. In addition, the bottom surface and the lateral surfaces of the blank are formed with flutes via the preliminary mold so as to assist in ventilation during molding of the blank in the high temperature mold.

10 Claims, 5 Drawing Sheets

TWO-STAGE FORMING PROCESS FOR PRODUCING AN EXPANDED SOLE

BACKGROUND OF THE INVENTION

1. Field of the Invention

The invention relates to a process for producing an expanded sole, more particularly to a process in which an unexpanded blank is formed in a preliminary mold and then subjected to an inspection prior to forming into an expanded sole in a high temperature mold for expansion and crosslinking.

2. Description of the Related Art

Various processes are available for producing expanded soles from polyethylene vinyl chloride (EVA). In one of the processes, a molten EVA composition is fed directly into a high temperature mold where the composition will undergo reactions for expansion and cross-linking. In another processes, EVA compositions are first formed into sheets or other forms which are then cut and placed in a high temperature mold for forming into a final product.

U.S. patent application Ser. No. 09/157,622 which was filed by the Applicant of the application discloses a two-stage molding process for the production of an expanded sole from EVA wherein a molten EVA composition is first fed into a preliminary mold to form an unexpanded blank which is then inspected for quality control, and the qualified blank is subsequently placed in another mold to undergo a reaction for expansion and cross-linking of the blank. This two-stage process is aimed at solving the problems encountered with a conventional single-stage process in which a molten material is fed directly into a high temperature mold to undergo reactions for expansion and cross-linking. Especially, the two-stage process does not require expensive high-pressure operating hydraulic molds, and minimizes non-recyclable waste by preliminarily forming a recyclable unexpanded blank for product inspection prior to forming of the blank in a high-temperature second mold to undergo a reaction for expansion and cross-linking. The unexpanded blank, upon inspection, is combined with an additional material, if underweight, or is cut out partially, if overweight, or otherwise is recycled so that no waste is produced after the final heating stage. However, the two-stage process as disclosed therein suffers from a drawback in that, as the cavities in the first and second molds are substantially the same in dimensions, the blank formed in the first mold would substantially fit the cavity of the second mold, resulting in difficult placement of the blank in the second mold and difficult venting of air from the second mold when the unexpanded blank is formed in the second mold.

SUMMARY OF THE INVENTION

An object of the present invention is to provide an improved two-stage process for producing an expanded EVA sole which overcomes the drawbacks encountered with the aforesaid two-stage process.

Another object of the present invention is to provide a method for producing an expanded EVA sole which is colored only at an outer surface thereof, thus saving the amount of a coloring agent used in coloring the sole.

Accordingly, the present invention provides a method for making an expanded sole in which a blank is preliminarily molded as an unexpanded form from a foamable molding composition in a preliminary mold having a sole-shaped mold cavity and is then subjected to a product inspection, followed by a high temperature heating to undergo a reaction for expansion and cross-linking in a high-temperature mold having a sole-shaped mold cavity. The method comprises: forming the unexpanded blank with a thickness greater than and with a cross-section smaller than those of the mold cavity of the high-temperature mold by providing the mold cavity of the preliminary mold with a height greater than and with an area smaller than those of the mold cavity of the high-temperature mold, thus facilitating placement of the blank into the high-temperature mold and venting air easily from the high-temperature mold, wherein the cross-section lies in a plane transverse to the thickness.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
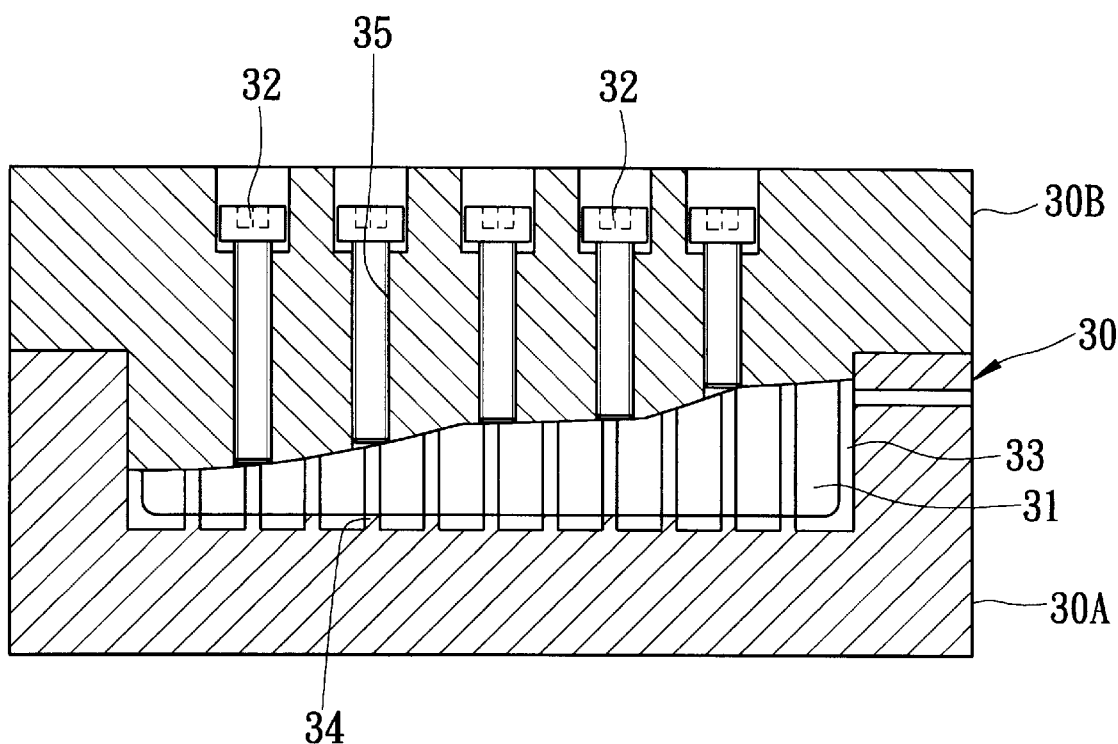
FIG. 1 is a sectional view showing a preliminary mold used in a process embodying the present invention.
Figure 4:
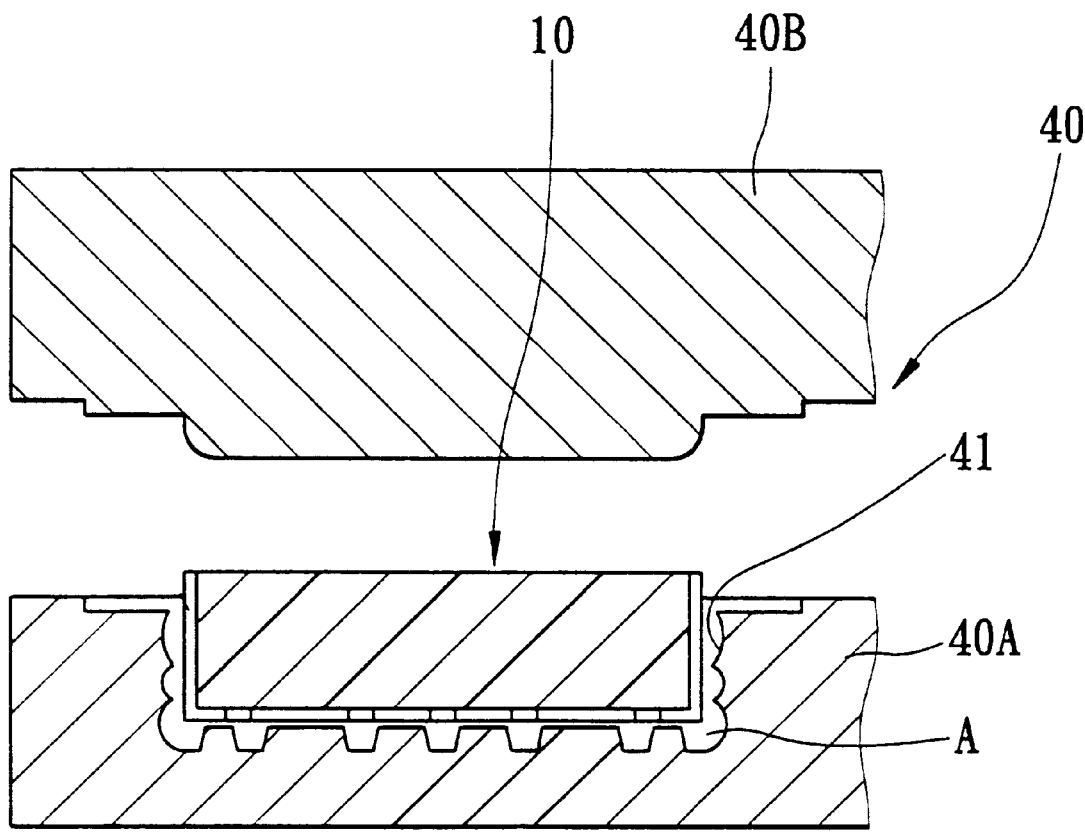
FIG. 4 is a sectional view showing a high temperature mold used in the process embodying the present invention.

In a preferred embodiment of a process according the present invention, an expanded sole is fabricated from a foamable molding composition containing polyethylene vinyl acetate (EVA) granules and other ingredients such as a cross-linking agent, a foaming agent, etc. A preliminary mold shown at 30 in FIG. 1, and a high-temperature mold shown at 40 in FIG. 4, are used in the embodiment. As shown in FIG. 1, the preliminary mold 30 includes a female mold 30A and a male mold 30B which confines a sole-shaped mold cavity 31. The mold cavity 31 has a laterally surrounding wall formed with upwardly extending ribs 33, and a bottom cavity wall formed with intersecting ribs 34. The upper mold 30B define a top cavity wall of the mold cavity 31, and is provided with a plurality of screw holes 35 for receiving adjustment screw bolts 32.

As shown in FIG. 4, the high-temperature mold 40 includes a male mold 40B and a female mold 40A with a sole-shaped mold cavity 41. The mold cavity 41 has a size different from that of the mold cavity 31 of the preliminary mold 30. Particularly, the preliminary mold 30 is so dimensioned that the mold cavity 31 has a height greater than those of the mold cavity 41, with a cross-section along a plane transverse to the height being smaller than that of the mold cavity 41, while the volume of the mold cavity 31 substantially conforms to that of the mold cavity 41.

In operation, the molten EVA molding composition is first fed into the preliminary mold 30 in a predetermined amount, and is heated and kept at a constant temperature that is sufficient to soften the EVA composition but is lower than a temperature that will cause the EVA molding composition to undergo a reaction for expansion and cross-linking. Suitable temperatures for softening the EVA composition range from 80° C. to 100° C. In this embodiment, a temperature of about 100° C. is employed.

Figure 2:
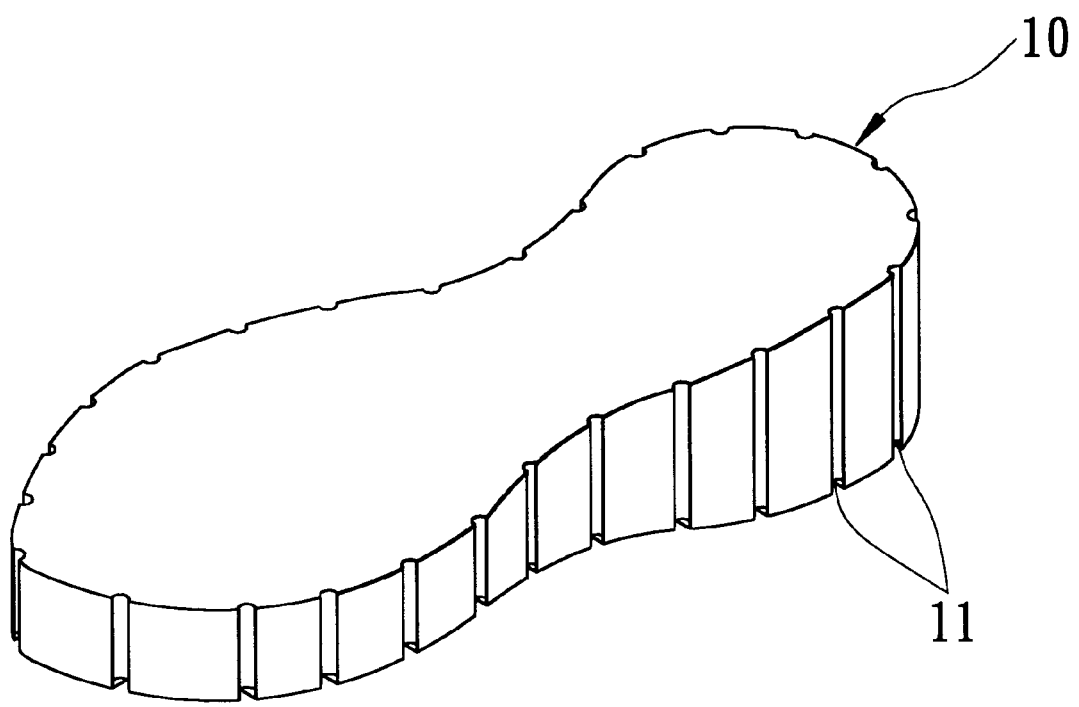
FIG. 2 is a perspective view of an unexpanded blank produced by the process in the present invention.
Figure 3:
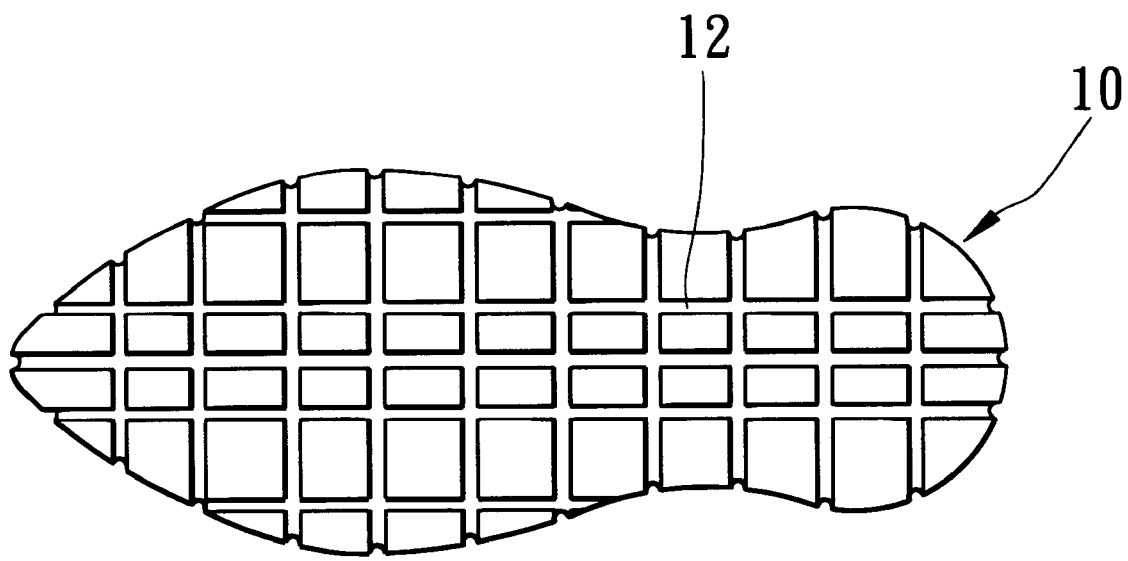
FIG. 3 is a plan view of the unexpanded blank of FIG. 2.

Within the mold cavity 31 of the preliminary mold 30, the EVA composition is molded into an unexpanded blank 10 which has vertical flutes 11 in the peripheral surface thereof and intersecting flutes 12 in the bottom thereof, as shown in FIGS. 2 and 3. The adjustment screw bolts 32 are provided in the male mold 30B can be moved into or out of the mold cavity 31 through the screw holes 35 for varying and adjusting the internal volume of the mold cavity 31.

After the unexpanded blank 10 is formed, it is removed from the preliminary mold 30 and is subjected to an inspection for quality control. If the blank 10 is deformed and unqualified, the blank 10 is recycled. The qualified blank 10 is placed in the high-temperature mold 40, where the blank is heated to a temperature sufficient to undergo a reaction for expansion and cross-linking of the EVA molding composition of the blank 10. A suitable temperature for the reaction ranges from 150–180° C. In this embodiment, a temperature of about 170° C. is used. Note that the blank 10 is introduced into the high-temperature mold 40 from the preliminary mold 30 without being subjected to any cooling step.

Figure 5:
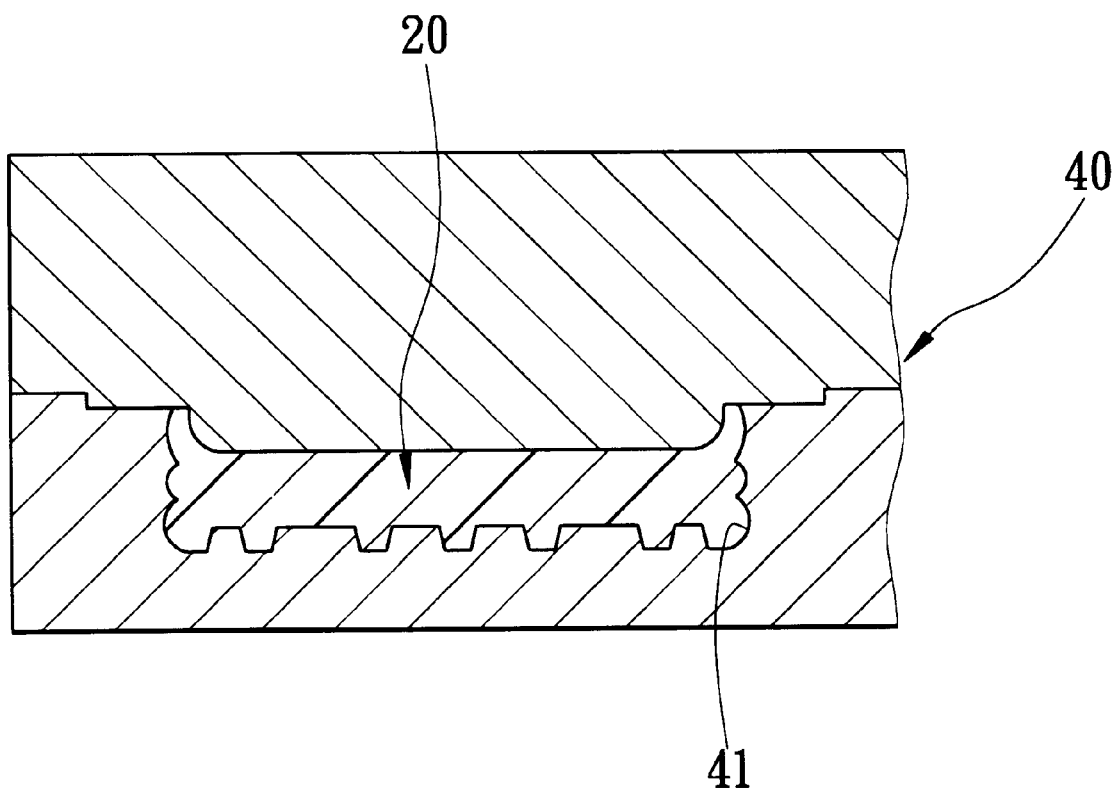
FIG. 5 is the same view as FIG. 4 but with the high temperature mold being closed.

Due to the particularly dimensioned mold cavity 31 of the preliminary mold 30 relative to the high-temperature mold 40, when the blank 10 is placed in the mold cavity 41 of the high-temperature mold 40, the blank 10 is smaller in cross-section than the mold cavity 41 but is greater in thickness than the mold cavity 41. As a result, a clearance (A) is created between the blank 10 and the walls of the mold cavity 41, as shown in FIG. 4. This facilitates placement of the blank 10 in the mold cavity 41. When the male mold 40B is closed, the blank 10 completely fills the mold cavity 41 as shown in FIG. 5. Since there are flutes 11 and 12 in the surfaces of the blank 10, the air in the mold cavity 41 can be vented through the flutes 11 and 12 when the blank 10 is pressed in the mold cavity 41 via the male mold 40DB. At the temperature of the high-temperature mold 40, the blank undergoes a reaction for expansion and cross-linking. The high-temperature mold 40 is subsequently opened for expansion of the sole 20 formed in the mold 40. The expanded sole is then cooled for setting of the shape of the sole.

In another embodiment, the expanded sole 20 is provided with an outer colored surface by using a thin colored facing sheet (not shown). The facing sheet may be preformed from a sheet forming composition which contains EVA, a foaming agent, a delustering agent (e.g. wax, Ca (CO$_3$)$_2$) and a coloring agent. The preformed facing sheet may be placed in abutment with the inner wall of the mold cavity 31 of the preliminary mold 30 before the EVA foamable molding composition for forming the blank is introduced into the mold cavity 31 so that the thin facing sheet wraps around the unexpanded blank 10 after forming. The unexpanded blank 10 formed as such has a non-lustrous colored outer surface.

The method according to the present invention provides the following advantages:

Because of the preliminary forming of the unexpanded blank and the subsequent inspection of the blank prior to forming of an expanded sole and because of the recycling of the unqualified blank after inspection, almost no waste is produced in the method of the present invention.

As the mold cavity 31 of the preliminary mold 30 is adjustable to vary the internal volume thereof to an extent by using the adjustment screw bolts 32, it can match with a range of sizes of the high temperature molds 40.

Furthermore, Since the preliminary mold 30 and the high-temperature mold 40 have substantially the same internal volume, and since the mold cavity 31 is deeper and narrower than the mold cavity 41, the blank produced by the mold 30 can be placed conveniently into the mold cavity 41 and fill every corner in the molding cavity 41, and air can be vented effectively from the mold cavity 41, thereby avoiding occurrence of undesirable oxidation reaction with air and deformation, and resulting in uniform density and a good skin.

Moreover, as the blank 10 is not subjected to a cooling process after being formed in the preliminary mold 30, the time and energy needed to cure the blank 10 in the high-temperature mold 40 can be reduced.

In addition, compared to the conventional process in which a foamed sole is colored entirely by adding a coloring agent to the foamable EVA molding composition to form the sole, the use of the thin colored facing sheet layer to impart a color to the outer surface of the blank 10 only reduces the amount of the coloring material needed, saves the cost of the coloring material, and decreases pollution. Besides, the time required for injection molding the blank 10 is reduced as the EVA foamable molding composition thereof does not require any coloring agent and thus eliminates the need to clean the equipment for injection molding whenever a differently colored sole blank is desired to be formed, and the need of re-adjusting the time of the opening and closing operations to accommodate the foamable molding composition varied to provide a different color.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What I claim is:

1. A method for making an expanded sole in which a blank is preliminarily molded as an unexpanded form from a foamable molding composition in a preliminary mold having a sole-shaped mold cavity and is then subjected to a product inspection, followed by a high-temperature heating to undergo a reaction for expansion and cross-linking in a high-temperature mold having a sole-shaped mold cavity, the method comprising:

forming the unexpanded blank with a thickness greater than and with a cross-section smaller than those of the mold cavity of the high-temperature mold by providing the mold cavity of the preliminary mold with a height greater than and with an area smaller than those of the mold cavity of the high-temperature mold, thus facilitating placement of the blank into the high-temperature mold and venting air easily from the high-temperature mold, wherein the cross-section lies in a plane transverse to the thickness.

2. The method as claimed in claim 1, further comprising forming flutes on the bottom surface and the lateral surfaces of the blank via the preliminary mold so as to assist in ventilation during molding of the blank in the high temperature mold.

3. The method as claimed in claim 2, wherein said foamable molding composition contains polyethylene vinyl acetate.

4. The method as claimed in claim 2, wherein the volume of the mold cavity of the preliminary mold is substantially equal to that of the mold cavity of the high-temperature mold.

5. The method as claimed in claim 2, wherein the mold cavity of the preliminary mold is provided with a bottom wall which is formed with intersection ribs and a laterally surrounding wall which is formed with upwardly extending ribs.

6. The method as claimed in claim 2, further comprising adjusting the volume of the mold cavity of the preliminary mold.

7. The method as claimed in claim 6, wherein the preliminary mold includes an upper male mold and a lower female mold, said male and female molds confining said mold cavity of said preliminary mold, said upper male mold being provided with screw holes and adjustment screw bolts threadedly received in said screw holes, said screw bolts being movable into or out of said mold cavity of said preliminary mold through said screw holes for changing the internal volume of said mold cavity of said preliminary mold.

8. The method as claimed in claim 1, further comprising pre-forming a thin colored facing sheet, and placing the thin colored facing sheet in the mold cavity of the preliminary mold before the foamable molding composition is fed into the preliminary mold, wherein the thin colored facing sheet covers the blank formed of the foamable molding composition.

9. The method as claimed in claim 8, wherein the foamable molding composition comprises polyethylene vinyl acetate, the thin colored facing sheet comprising polyethylene vinyl acetate and a coloring agent.

10. The method as claimed in claim 9, wherein the thin colored facing sheet further comprises a delustering agent.

* * * * *